(12) United States Patent
Komashinskiy et al.

(10) Patent No.: US 12,506,748 B2
(45) Date of Patent: Dec. 23, 2025

(54) THREAT CONTROL METHOD AND SYSTEM

(71) Applicant: F-Secure Corporation, Helsinki (FI)

(72) Inventors: Dmitriy Komashinskiy, Helsinki (FI); Paolo Palumbo, Helsinki (FI); Johannes Rave, Helsinki (FI); Matti Aksela, Helsinki (FI)

(73) Assignee: F-Secure Corporation, Helsinki (FI)

( * ) Notice: Subject to any disclaimer, the term of this patent is extended or adjusted under 35 U.S.C. 154(b) by 491 days.

(21) Appl. No.: 17/358,648

(22) Filed: Jun. 25, 2021

(65) Prior Publication Data

US 2021/0409429 A1 Dec. 30, 2021

(30) Foreign Application Priority Data

Jun. 26, 2020 (EP) .................................. 20182542

(51) Int. Cl.
*H04L 9/40* (2022.01)
*G06F 8/65* (2018.01)
(Continued)

(52) U.S. Cl.
CPC ............ *H04L 63/1416* (2013.01); *G06F 8/65* (2013.01); *G06N 5/04* (2013.01); *G06N 7/023* (2013.01);
(Continued)

(58) Field of Classification Search
CPC ............ H04L 63/1408; H04L 63/1416; H04L 63/1425; H04L 63/1475; G06N 5/04; G06N 7/023; G06N 20/00; G06F 8/65
See application file for complete search history.

(56) References Cited

U.S. PATENT DOCUMENTS 10,581,874 B1 * 3/2020 Khalid ................ H04L 63/1425
2012/0110174 A1 * 5/2012 Wootton ............. H04L 63/1416
709/224
(Continued)

FOREIGN PATENT DOCUMENTS

CN 108596434 A 9/2018
JP 2017097853 A 6/2017

OTHER PUBLICATIONS

European Search Report, issued by the European Patent Office in Application No. EP 20182542 on Nov. 12, 2020. 2 pages.
(Continued)

*Primary Examiner* — Thomas A Gyorfi
(74) *Attorney, Agent, or Firm* — Meunier Carlin & Curfman LLC

(57) ABSTRACT

A system and a method for distributing components of a threat detection model for a threat control network, the threat control network comprising interconnected network nodes. The threat control network comprises security agent modules which collect data related to the respective network node of the security agent module, share information based on the collected data in the established internal network and use the collected data and information received from the internal network for generating and adapting threat detection models related to the respective network node. At least part of the nodes comprise at least the following components of the threat detection model: detection logic part comprising detection rules, detection logic parameter part comprising parameter values, core data primitive part comprising a set of key primitives. The method comprises distributing the said components of a threat detection model to a node independently from the other said components of the same node.

15 Claims, 3 Drawing Sheets

(51) Int. Cl.
    *G06N 5/04*       (2023.01)
    *G06N 7/02*       (2006.01)
    *G06N 20/00*      (2019.01)

(52) U.S. Cl.
    CPC ......... *G06N 20/00* (2019.01); *H04L 63/1425*
                  (2013.01); *H04L 63/1475* (2013.01)

(56) References Cited

U.S. PATENT DOCUMENTS

| | | | |
|---|---|---|---|
| 2015/0373034 A1 | 12/2015 | Seshadri et al. | |
| 2015/0373043 A1* | 12/2015 | Wang | G06F 21/6254 |
| | | | 706/12 |
| 2018/0288063 A1* | 10/2018 | Koottayi | G06F 21/50 |
| 2019/0036948 A1* | 1/2019 | Appel | G06N 20/00 |
| 2019/0052659 A1* | 2/2019 | Weingarten | H04L 67/34 |
| 2019/0230100 A1* | 7/2019 | Dwyer | H04L 41/046 |
| 2020/0076835 A1* | 3/2020 | Ladnai | G06F 16/955 |
| 2020/0153843 A1 | 5/2020 | Aksela et al. | |
| 2021/0073377 A1* | 3/2021 | Coull | G06N 20/00 |

OTHER PUBLICATIONS

Office Action from corresponding JP 2021-104988, dated Feb. 17, 2025, 11 pages.

\* cited by examiner

THREAT CONTROL METHOD AND SYSTEM

PRIORITY

This application claims priority of European patent application number 20182542.9 filed on Jun. 26, 2020, the contents of which are incorporated herein by reference.

TECHNICAL FIELD

The present invention relates to a method of threat control in a computer network security system and to a computer network security system.

BACKGROUND

Computer network security systems have started to become popular. An example of such is known as Endpoint Detection & Response (EDR) products and services. EDR focuses on the detection and monitoring of a breach as it occurs and after it occurs and helps to determine how best to respond and/or take automated action. The growth of EDR has been made possible in part by the emergence of machine learning, big data and cloud computing.

Traditional EDR or other similar systems deploy data collectors on selected network endpoints (which can be any element of IT infrastructure). The data collectors observe activities happening at the endpoint and then send the collected data to a central, backend system ("EDR backend"), often located in the cloud. When the EDR backend receives the data, the data is processed (e.g. aggregated and enriched) before being analysed and scanned by the EDR provider for signs of security breaches and anomalies.

Data volumes and threat surfaces expand at enormous rates. As threats against the computer systems can be tailored at rapid rates, also security models against the threats need to evolve. It will not be possible to keep up with ever increasing cyber threats, both file-based and file-less, by using present "simple" endpoint protection methods nor purely by enhancing the capabilities of the cloud and backend. However, smarter endpoints also pose multiple problems in terms of vulnerability and increasing also capabilities and data privacy requirements. Thus, traditional means simply cannot address the speed of change and variety of situations encountered.

There exist prior solutions, such as F-Secure's® real time protection network (ORSP) and Immunet®, aiming to solve these problems with cloud-based approaches. These are based on traditional signatures stored in the cloud which is queried by end points. Thus, when a threat is detected and blocked for one user, all other users receive the same protection. However, these solutions don't offer the best possible protection for each device with evolving threats, for example in situations where the attacks can be targeted and are novel for each system, nor is a fully centralized processing approach very effective with ever increasing data volumes. Thus solutions offering better and more effective protection are needed.

The prior art solutions are also not able to effectively detect threat actors in different kind of environments and contexts or adapt themselves in an efficient way to different circumstances. For these reasons there is a need for improved computer network security systems that are able to deal with attacks that are difficult to detect with traditional methods.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

For detecting threat actors reliably, e.g. with EDR solutions, variation must be expected when dealing with behaviour in different contexts. For example, misuse detections are too narrow producing too high precision and low recall rate whereas anomaly detection systems suffer with over generalization and lack of visibility. Therefore, the above-mentioned technologies cannot be used in the same way in all environments or contexts, but instead require a careful customization (i.e. parametrization) that is based on the specific knowledge of the context in which they need to operate.

The present invention solves the above-mentioned problems and provides a method for optimizing how detections are reliably and efficiently specialised for different actors, e.g. endpoints and/or or backend(s), in different kind of environments and contexts.

According to a first aspect of the invention there is provided a method for distributing components of a threat detection model for a threat control network comprising interconnected network nodes as specified in claim 1. The threat control network comprises security agent modules which collect data related to the respective network node of the security agent module, share information based on the collected data in the established internal network and use the collected data and information received from the internal network for generating and adapting threat detection models related to the respective network node. In the solution of the invention at least part of the nodes comprise at least the following components of the threat detection model: detection logic part comprising detection rules, detection logic parameter part comprising parameter values, core data primitive part comprising a set of key primitives. The method comprises distributing the said components of a threat detection model to a node independently from the other said components of the same node.

According to a second aspect of the invention, there is provided a system as specified in claim 13. The system comprises a threat control network, the threat control network comprising interconnected network nodes. The threat control network comprises security agent modules which are configured to collect data related to the respective network node of the security agent module, share information based on the collected data in the established internal network and use the collected data and information received from the internal network for generating and adapting threat detection models related to the respective network node. At least part of the nodes comprise at least the following components of the threat detection model: detection logic part comprising detection rules, detection logic parameter part comprising parameter values, and core data primitive part comprising a set of key primitives. The system is configured to distribute the said components of a threat detection model to a node independently from the other said components of the same node.

According to a third aspect of the invention, there is provided a computer program product comprising a computer storage medium having computer code stored thereon, which when executed on a computer system, causes the system to operate as a server according to the above second aspect of the invention.

With the solution of the invention threat control in a computer network can be reliably and efficiently adapted to different circumstances and different contexts and it can effectively detect threat actors in different kind of environments and contexts.

The solution of the invention can be used for example in EDR solutions to facilitate operation in environments that are very different from each other and on which the definition of anomaly is very context dependent.

The solution of the invention can be implemented at the endpoint and/or at the side of the backend.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DETAILED DESCRIPTION

Figure 1:
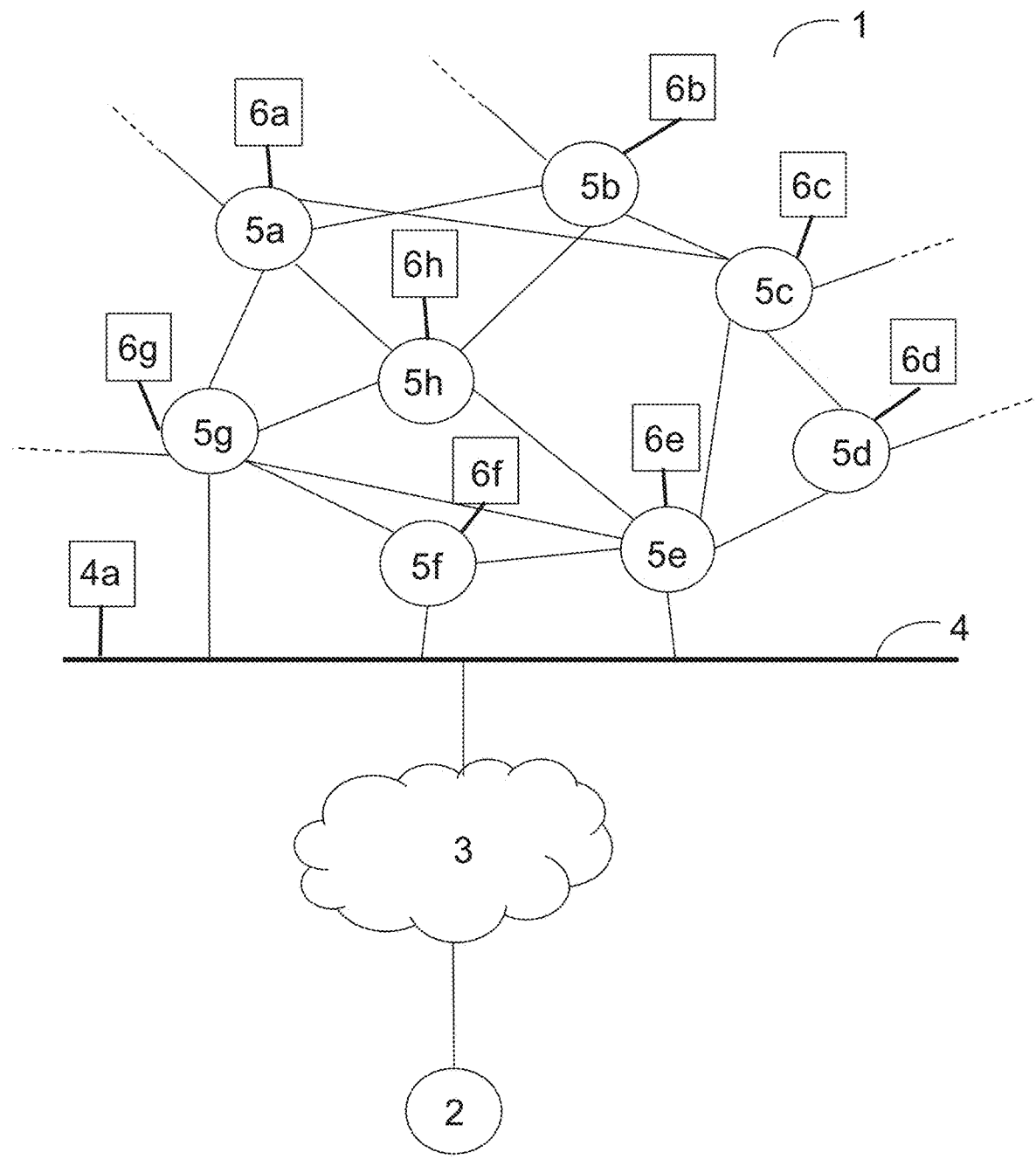
FIG. 1 presents schematically an example network architecture of one embodiment of the invention.

FIG. 1 presents schematically an example network architecture of one embodiment of the invention in which the solution of the invention can be used. In FIG. 1 a part of a first computer network 1 is schematically illustrated into which a computer system, for example an EDR system, has been installed. Also, any other computer system that is able to implement the embodiments of the invention can be used instead or in addition to the EDR system used in this example. The first computer network is connected to a security service network, here security backend/server 2 through the cloud 3. The backend/server 2 forms a node on the security service computer network relative to the first computer network. The security service computer network can be managed by an EDR system provider and may be separated from the cloud 3 by a gateway or other interface (not shown) or other network elements appropriate for the backend 2. The first computer network 1 may also be separated from the cloud 3 by a gateway 4 or other interface. Other network structures are also possible.

The first computer network 1 is formed of a plurality of interconnected network nodes 5a-5h, each representing an element in the computer network 1 such as a computer, smartphone, tablet, laptop, or other piece of network enabled hardware. Each network node 5a-5h shown in the computer network also represents an EDR endpoint onto which a security agent module 6a-6h, that may include a data collector or "sensor", is installed. Security agent modules may also be installed on any other element of the computer network, such as on the gateway or other interface. In the example of FIG. 1 a security agent module 4a has been installed on the gateway 4. The security agent modules, 6a-6h, 4a collect various types of data at the nodes 5a-5h or gateway 4 including, for example, program or file hashes, files stored at the nodes 5a-5h, logs of network traffic, process logs, binaries or files carved from memory (e.g. DLL, EXE, or memory forensics artefacts), and/or logs from monitoring actions executed by programs or scripts running on the nodes 5a-5h or gateway 4 (e.g. tcp dumps).

The data collected may be stored in a database or similar model for information storage for further use. Any kind of behaviour profiles/representations of behaviours of applications/services/processes may further be constructed at the nodes 5a-5h by a security application, at the backend/server 2, and/or at a second server and be stored in the database. The nodes 5a-5h and the server 2 typically comprise a hard drive, a processor, and RAM.

Any type of data which can assist in detecting and monitoring a security threat, such as a security breach or intrusion into the system, may be collected by the security agent modules 6a-6h, 4a during their lifecycle and that the types of data which are observed and collected may be set according to rules defined by the EDR system provider upon installation of the EDR system and/or when distributing components of a threat detection model according to the solution of the present invention. In an embodiment of the present invention, at least part of the security agent modules 6a-6h may also have capabilities to make decisions on the types of data observed and collected themselves. For example, the security agents 6a-6h, 4a may collect data about the behaviour of programs running on an EDR endpoint and can observe when new programs are started. Where suitable resources are available, the collected data may be stored permanently or temporarily by the security agent modules 6a-6h, 4a at their respective network nodes or at a suitable storage location on the first computer network 1 (not shown).

The security agent modules 6a-6h, 4a are set up such that they send information such as the data they have collected or send and receive instructions to/from the EDR backend 2 through the cloud 3. This allows the EDR system provider to remotely manage the EDR system without having to maintain a constant human presence at the organisation which administers the first computer network 1.

According to the present invention, the security agent modules 6a-6h, 4a can also be configured to establish an internal network, e.g an internal swarm intelligence network, that comprises the security agent modules of the plurality of interconnected network nodes 5a-5h of the local computer network 1. As the security agent modules 6a-6h, 4a collect data related to the respective network nodes 5a-5h of each security agent module 6a-6h, 4a, they are further configured to share information that is based on the collected data in the established internal network. In one embodiment the swarm intelligence network is comprised of multiple semi-independent security nodes (security agent modules) which are capable of functioning on their own as well. Thus, the numbers of instances in a swarm may well vary. There may also be more than one connected swarms in one local computer network, which collaborate with one another.

The security agent modules 6a-6h, 4a are further configured to use the collected data and information received from the internal network for generating and adapting models related to the respective network node 5a-5h. For example, in case a known security threat is detected, the security agent module 6a-6h, 4a is configured to generate and send a security alert to the internal network and to a local centre node (not shown) in the local computer network and to activate security measures for responding to the detected security threat. Further, in case an anomaly that is estimated very likely to be a new threat is identified, the security agent module 6a-6h, 4a is configured to verify and contain the threat, generate a new threat model on the basis of the collected data and received information and share the generated new threat model in the internal network, such as a swarm intelligence network, and the local centre node.

One threat control method according to an embodiment of the invention can comprise establishing an internal network, such as a swarm intelligence network, comprising security agent modules of a plurality of interconnected network nodes of a local computer network.

In this scenario, the one or more security agent modules collect data related to the respective network node of the security agent module. Data may be collected from the plurality of network nodes by using various kinds of endpoint sensors. The collected data blocks may be referred to as events. In an embodiment, monitoring the behaviour of the first suspicious event and any related events may comprise monitoring the behaviour of a computer process and any child processes thereof. In most cases much of the data collected is in fact not of suspicious origin, but since the system should be careful to aim to notice all malicious activity, monitoring and data collection may always remain active. However, it is possible to adjust the granularity of data collection, either from the centralized location or by the sensors themselves on the basis of noticing something of interest.

Information based on the collected data can be shared in the established internal network. In an embodiment, the amount of information exchanged between any two of the security agent modules in the internal network may be larger between the security agent modules locating close to one another than between the security agent modules locating further apart from one another. The information referred to may be for example aggregate information, identification of noticed suspicious processes/users/hosts/events or similar.

The collected data and information received from the internal network can be used, at the security agent modules, for generating and adapting models related to the respective network node. The adaptive models may for example be configured to learn the local behaviour on the respective host which allows the establishment of a more granular understanding of normal behaviour in that node and hence easier detection of anomalies. When the adaption is done locally, it can be much more efficient and faster to react to changes if needed. In an embodiment, the models used by the security agent modules that are located close to one another may be more similar in behaviour when compared to those located further away as a consequence of the more intense information sharing. The distance between the modules is not necessarily a physical distance, but communication intensity based shared localization, for example.

In case a known security threat is detected, a security alert can be generated by the security agent and then sent to the internal network and to a local centre node in the local computer network. Further any security measures for responding to the detected security threat may be activated.

If a new threat is identified, the threat can be verified and contained by the security agent module and a new threat model can be generated on the basis of the collected data and received information. Examples of such models could be automatically generated detection rules or probabilistic models trained on the event/behavioural data on that node to identify events similar to the newly observed threat. Further, the generated new threat model can be shared in the internal network and with the local centre node to allow all nodes to detect similar threats in a privacy-sensitive manner.

In an embodiment, the security agent modules are able to activate one or more components of their modular architecture and to replicate themselves. Further, in case any of the security agent modules detects the need for further resources for managing the detected security threat or for analysis of the suspected security threat, the security agent modules may in one embodiment of the invention request resources from other security agent modules or even generate new virtual security agent modules.

In an embodiment, the security agent modules use sandboxing techniques for determining a remedy for the detected security threat and/or further analysing the behaviour of potentially malicious entities. The sandboxing can be utilized to execute suspicious code or actions in an environment where the outcome can be observed, and the validity of the threat established.

In an embodiment, a suspicious event among the monitored events may be detected by one or more detection mechanisms used. In an embodiment, the detection mechanisms used to detect the suspicious event may comprise using at least one of: a machine learning models, a scanning engine, a heuristic rule, a statistical anomaly detection, fuzzy logic based models, any predetermined rules.

In an embodiment, the method may further comprise training machine learning models used in the detection of threats and/or as a response to threats by utilizing one or more following approaches used for training machine learning models: distributed learning via combining local and global information and model parts, reinforcement learning via getting feedback on successful end results, meta-learning via utilizing external information in the learning process; and/or information sharing to bootstrap models and adjust learning behaviour.

Figure 2:
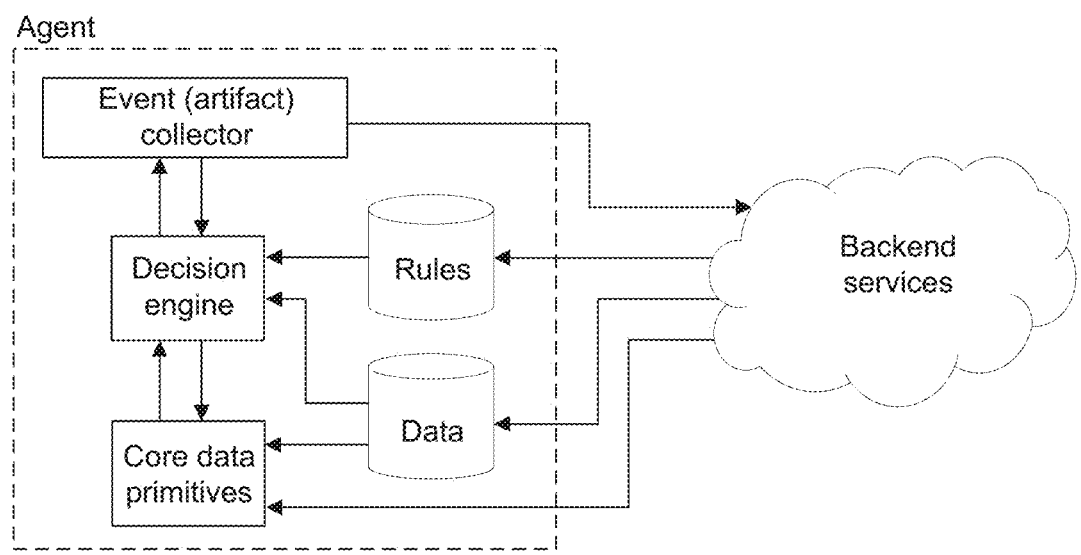
FIG. 2 presents an example distribution of threat detection model components according to an embodiment of the invention.

In the solution of the present invention the decision-making functionalities and parametrizations of said functionalities are independently distributed to network nodes, such as endpoints and/or the backend. Functionalities in the context of the solution of the invention may comprise at least one of the following: detection rules (e.g. specific and/or heuristic), statistical logic and models, machine learning training and inference capabilities. Parametrizations in the context of the solution of the invention may comprise parameters, the set of information, data structures and coefficients that are required by the above-mentioned functionalities to operate correctly. A set of core functionalities may be available at the endpoint. FIG. 2 presents one example embodiment of the distribution of a threat detection model according to an embodiment of the invention where the context of the endpoints is taken into account when configuring and managing the threat control network.

In the solution of the present invention this can be achieved by distributing the components of a threat detection model to a node independently from the other said components of the same node. The distribution of the components of the threat detection model of a node can be carried out independently from each other at different time instances, from different sources and/or at different time intervals and/or update frequencies.

In the solution of the invention the threat control network can comprise interconnected network nodes, e.g. as described above, which can comprise security agent modules which are configured to collect data related to the respective network node of the security agent module, share information based on the collected data in the established internal network and use the collected data and information received from the internal network for generating and adapting threat detection models related to the respective network node. At least part of the nodes comprise at least the following independently distributed components of the threat detection model: detection logic part comprising detection rules, detection logic parameter part comprising parameter values, and core data primitive part comprising a set of key primitives.

In one embodiment of the invention the detection logic part is updated multiple times a day, e.g. hourly, or daily, and/or modified based on human input. The detection rules can comprise a specific detection logic which can change very often. In one embodiment of the invention the detection rules are evaluated and/or modified by humans before distributing them to the nodes.

In one embodiment of the invention detection logic parameter part comprises at least one of the following: parameters to enable machine learning inference, such as membership checks and/or thresholds over results of machine-learning-model. The detection logic parameters can be continuously kept up-to-date e.g. by automated systems. In one embodiment of the invention detection logic parameter part is updated automatically by machine learning and/or multiple times a day, e.g. multiple times in an hour.

The core data primitive part can comprise a set of key primitives, and they can be changed rarely. The set of key primitives can be e.g. modified by humans and/or include several levels of interfacing up to training functionalities if relevant and/or necessary. In one embodiment of the invention core data primitive part is updated with software build updates, and/or modified based on human input.

In the solution of the invention the detection logic part, the detection logic parameter part and core data primitive part can be deployed and distributed independently from each other and with the required flexibility.

The said components of the threat detection model (the detection logic part, the detection logic parameter part and core data primitive part) are configured so that the components work with each other in the desired way, e.g. so that detection logic parameters will be successfully interpreted and e.g. so that the detection logic parameters make detection rules functional. The independent updates to the components have to be done so that the updates do not break detection logic's consistency.

In one embodiment of the invention the detection rules, parameter values, the set of key primitives and/or the detection mechanisms used to detect security threats comprise machine learning related detection rules, parameter values and/or key primitives and/or comprise using machine learning models, a scanning engine, a heuristic rule, a statistical anomaly detection, fuzzy logic based models and/or predetermined rules.

In one embodiment of the invention at least part of the nodes comprising the said components of the threat detection model comprise a security agent module. In one embodiment of the invention at least part of the nodes comprising the said components of the threat detection model can be a part of a backend system.

In one embodiment of the invention each security agent module comprises the said components of the threat detection model and/or the said components of the threat detection model are distributed to security agents.

In one embodiment of the invention the threat control network is a threat control swarm intelligence network, and/or the threat control swarm intelligence network comprises a plurality of interconnected network nodes of a local computer network.

In one embodiment of the invention security agent modules are configured to collect data related to the respective network node of the security agent module, share information based on the collected data in the established internal network and use the collected data and information received from the internal network for generating and adapting threat detection models related to the respective network node.

In the following, some implementation examples are given for the different components of the solution of the invention:

In an example case of logistic regression-based inference which is defined as:

$$f(x) = \sigma(w^T x + b),$$

then:
the detection rules of the detection logic part can be:
p(x)<threshold,
the parameter values of detection logic parameter part can be:
(w, b, threshold), and
the set of key primitives of the core data primitive part can be:
implementation of sigmoid function and dot product.

In an example case of Gaussian kernel density estimator which is defined as:

$$p(x) = \frac{1}{N} \sum_{n=1}^{N} \frac{1}{(2\pi h^2)} \exp\left\{-\frac{\|x - x_n\|^2}{2h^2}\right\},$$

then:
a the detection rules of the detection logic part can be:
p(x)<threshold,
the parameter values of detection logic parameter part can be:
(threshold, {$x_1$, ..., $x_N$}, h), and
the set of key primitives of the core data primitive part can be:
implementation of Gaussian distribution probability density function.

Figure 3:
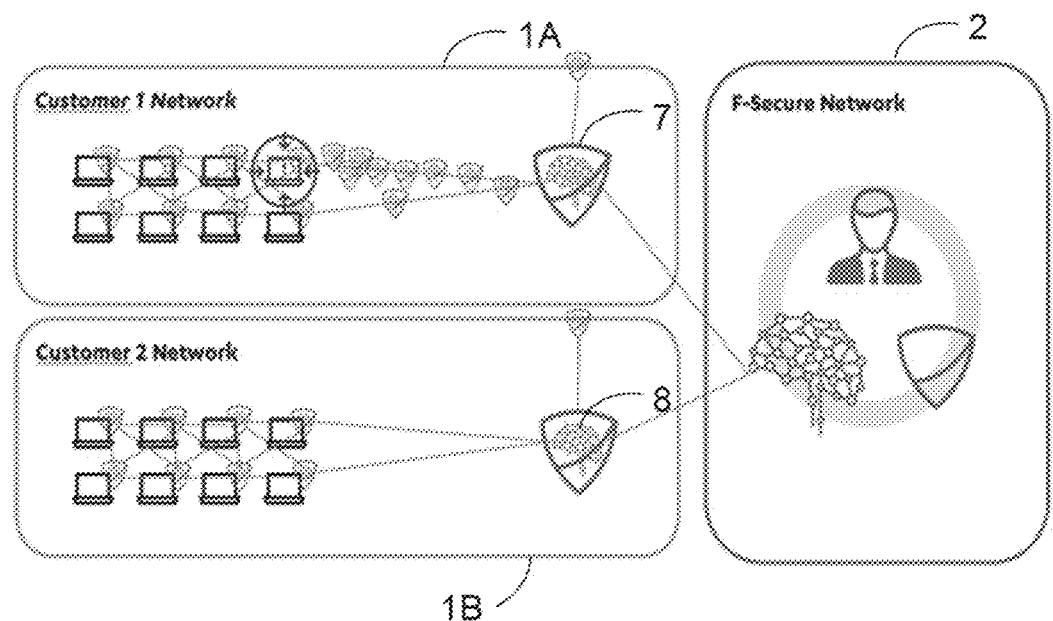
FIG. 3 presents an example embodiment of a solution of the present invention comprising two local computer networks and a security service network.

FIG. 3 illustrates a high-level concept of one embodiment of the invention. The example of FIG. 3 presents two local computer networks 1A, 1B, and a security service network 2, wherein each local computer network 1A, 1B further comprises a local centre node 7, 8 and a plurality of interconnected network nodes and a security agent module in each of the plurality of network nodes. The security agent modules can be configured to establish an internal swarm intelligence network in each local computer network.

In an example normal mode of operation, the agent's deployment structure can consists of on average one agent residing on one endpoint, together with a local communications node and information aggregation centre (local centre node 7,8). In an embodiment, as illustrated in FIG. 4 the security agents may be built such that at least some of their functionalities are inactive even if present thereby allowing for replication of new agents also into different roles than the original host has.

Figure 4:
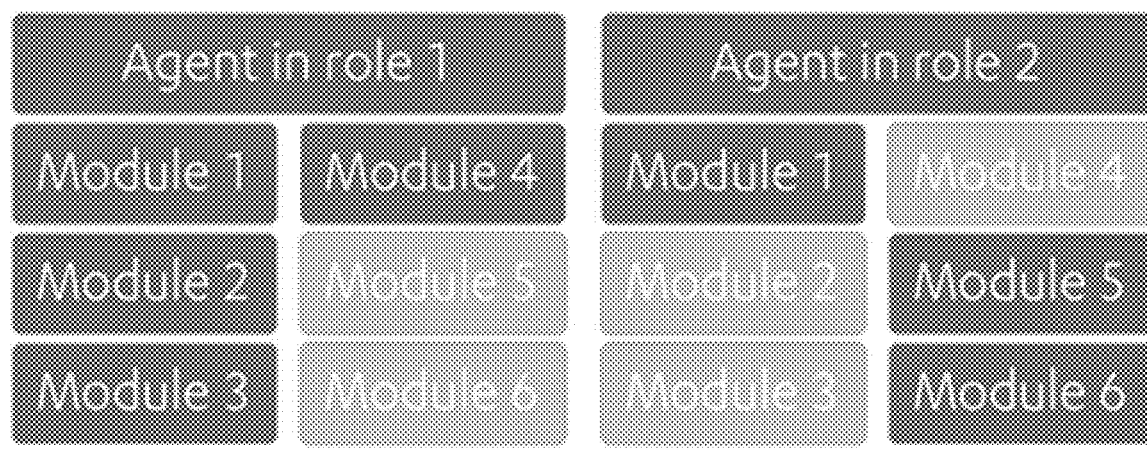
FIG. 4 presents an example of a modular structure of security agents according to an embodiment.

In the example embodiments presented in FIGS. 3 and 4 the detection logic part, the detection logic parameter part and core data primitive part of the threat detection model can be deployed and distributed independently from each other, for example as described above and/or e.g. so that detection logic part, the detection logic parameter part and core data primitive part are different in different local computer networks and/or different parts of the local computer network.

In the following further examples of the environment and operation of the threat detection system are described in which the distribution of the threat detection components can be utilized according to the invention.

In one embodiment, one or more meta-learning models are used to generate the new threat detection model, action model and/or response model and only higher-level representations of the learned information is shared in the internal swarm intelligence network and with the local centre node. Further, for example event abstractions may be built of the collected data for enabling the use of data across exact data set, device and version.

In an embodiment, information on alerts, statuses and other relevant entities are shared by using at least one language mod& for enabling the information to be interpretable by both computer systems and human experts.

The security alert and/or the generated new threat model is transmitted from the local centre node to a security service network for enabling the security service network to share the received security alert and/or the new threat model with other local computer networks and to take further action on the basis of the received security alert and the new threat detection model. In an embodiment, partial or full sets of information for cross-local-network learning in a privacy preserving manner is transmitted between the local centre node and the security service network.

Further, the security agent modules are configured to receive instruction and/or threat detection components from the security service network to evolve the behaviour of the security agent module for detection of and/or responding to the security threats. For example, guidance related to detections and/or response actions may be received, at the security agent modules, from human experts in a language model that is close to human language for allowing interaction between the human security experts and the security agent modules.

In an embodiment, further actions may be taken to secure the computer network and/or any related network node when a threat has been detected, such as taking immediate action by changing the settings of the network nodes in order to ensure an attacker is stopped and any traces of their moves is not destroyed. Changing the settings may include, for example, one or more nodes (which may be computers or other devices) being prevented from being switched off in order to preserve information in RAM, a firewall may be switched on at one or more nodes to cut off the attacker immediately, network connectivity of one or more of the network nodes may be slowed down or blocked, suspicious files may be removed or placed into quarantine, logs may be collected from network nodes, sets of command may be executed on network nodes, users of the one or more nodes may be warned that a breach has been detected and that their workstation is under investigation, and/or a system update or software patch may be sent from the EDR backend to the nodes in response to detecting a sign of a breach. In one embodiment of the invention one or more of these actions may be initiated automatically by the above-described models or algorithms. For example, using the above described methods, data has been collected and shared with the nodes in the computer network and the EDR backend and a threat model or an analysis algorithm has determined that a sign of a breach was detected. As soon as the model/algorithm makes the determination that a sign of a breach was detected, it may generate and issue a command to the related network nodes without human intervention to automatically initiate one or more of the above-described actions at the nodes. By doing this, a breach can be stopped and/or the damage minimised automatically at very high speeds and without human intervention.

In the following further embodiments of the threat detection model are described as practical implementation examples.

In prior art solutions it has been common to assume that a large amount of the intelligence is required to be centralized or have "strong" agents, but a more effective solution may be individual agents that are well equipped but also somewhat less holistic in their own capabilities and that are able to benefit from the interoperation between the agents. The lack of trying to encode everything into a fully replicated model enables having models protected against generic model stealing and aversion type of attacks as the response from all nodes in the swarm would not be the same and hence even if an aversion technique was successful on one node, it would not be expected to be generalized across all nodes.

However, the nodes should be highly connected and share information, both within the swarm located in one customer premises (where information sharing is essentially fully open) also to nodes outside of the customer premises due to the central host (to allow for cross-customer learning). This information sharing may include data, but also learnings in terms of, for example, incremental model additions or specific sub-models facing a certain part of possible threats and may be communicated in the proposed language model used for communication.

A much deeper collaboration between the nodes of the network that are closer to one another, or the agents working "near" each other (as measured for example by the amount of information shared between their locations), or agents being more similar in terms of their outputs and learning, than those further away resulting in local variations of parameters and operations allowing for not just node-specific agent adaption, but organization-specific and possibly team, office, etc. specific, too—all without the need to explicitly define the organizational relationships. Therefore, the solution of the invention can use a swarm-type approach of multiple connected and interacting network nodes that may have the capability to replicate themselves if needed.

Prior art reinforcement learning models suffer from severe challenges in requiring a huge amount of data to learn, as they usually do not utilize much prior knowledge. Here it is proposed to use meta-learning models (learning how to learn), encoding information on the surrounding world (possibly through probabilistic state models or similar approaches) and suitable methods for information sharing across the nodes. This can be seen as a federated transfer learning type of scenario as well, but the key is not to share the full models nor mere increments of a learned model, as both are not only inefficient but also prone to attacks, but higher-level representations of the learnt information that can be applied locally. In an example of the reinforcement learning the implementing technology may, or may not, be based on deep learning. It may as well be almost any other type of machine learning model found suitable. However, the core is in the concept of how to learn and how to share learning. Therefore, the solution of the invention can use distributed reinforcement learning with meta-learning, world models and information sharing.

The solution of the invention can use language models that are shared by both the AI and human experts for information sharing. In an embodiment, encoding information that can be used for training models in a language-like form may be used. However, this may be taken one step further and used as a means for communication and guidance sharing between the AI and experts. Instead of learning just by receiving code or data, or learning from actions, the AI may share information in the form of sentence-like descriptions which can be interpretable by both AI and expert alike. Examples of using the way of sharing guidance may be an expert making a decision to instruct an AI driven agent to contain a node which is exhibiting anomalous behaviour even if a validated threat detection has not yet been made.

Another major challenge to having models, even and especially in reinforcement learning type scenarios, properly learn in varying situations has been the formulation of reward functions, and the possible unwanted behaviour that may arise from an overly simplistic but effective reward model. In an embodiment, this is proposed to be circumvented by high-level purpose driven reward models with smaller sub-components to be modelled on the intended state (no intrusions) as well as benefit from positive actions, and to be abstracted to a level that can be applied across systems. Furthermore, rules of engagement may dictate what actions can be taken by each agent and in what situation to override possible conflicts. For these reasons the solution of the invention can use purpose-based learning with rules of engagement to avoid undesired behaviour.

A further component hindering the use of such systems has been the complexity and variability of data. Therefore the solution of the invention can encode multiple domains of information into event abstractions for transferability. The proposed solution according to an embodiment may revolve around building event abstractions of the information so that they can be used across exact data set, device and version. Abstractions may also be constructed from data and learnt and updated such a way that they will remain up-to-date and usable, including a human interpretable component.

Next practical example steps of an operation according to an embodiment will be described.

Deployment and distributing of the components of the threat detection model: As described above, in the solution of the invention the detection logic part, the detection logic parameter part and core data primitive part of the agents can be deployed and distributed independently from each other and with the required flexibility. In one embodiment of the invention, in which all agents may fundamentally have the same code base and/or ability to adapt to their role by activating different components in their modular architecture and replicate themselves, one would merely need to deploy one initial agent in a customer network with sufficient access rights, which would then discover servers and install copies of itself in the suitable locations and establish the internal communications network, e.g. an internal swarm communications network, as well as the backend update, reporting and communication channel. In addition, authentication and other required issues may need to be considered, and in first incarnations agents may be deployed on individual hosts.

Normal operation: The agents continuously monitor their environment and collect data, learning from what they see and build models of their hosts and their surroundings. These models may be shared across swarm nodes and used for learning, for example of users' behaviour on one computer vs. others in the network. Additionally, abstract information may be sent to the backend in a privacy preserving way. The agents utilize the abovementioned learning models to be prepared also for knowing what is normal.

Encountering a known threat: The agents detecting either a known threat or an anomaly indicating a known threat may instantly alert their swarm mates of the situation, also to prepare for threats that may deactivate them, and call for additional resources if needed (spin up new virtual agents or have them delivered from another host if there is risk of compromise). If the agent already has the means for response, that action may be taken. Encountering a novel threat: The agents, due to constantly learning what is normal and in a very granular manned due to their specificity with the data of their own nodes, are also equipped to detect novel threats. Their ability to interact with the users will be used to verify the threat, and if the threat is verified, take actions to contain it as well as build a new threat model that will be circulated, in the known language, to both swarm mates and also other customers through the central link. In some embodiments, the risk of the threat may be determined to be so great that autonomous containment actions may also be taken before awaiting a final decision. The degree of autonomous actions can always be adjusted as needed. The connectivity model also allows for the help of human experts to be called upon if needed.

Neutralizing a novel threat: The agents may also contain sandbox capabilities, which could be utilized for a safe environment and also containment, allowing for the use of evolutionary approaches for detecting how to neutralize the novel threat (try—evaluate—mutate—try again) as well as understanding the behaviour of such threats in much greater detail and further conveying that information.

Sharing new threat knowledge: as new threats are identified, they are encoded into the internal language representation for sharing across agents, centrally and therefrom also to other customers to ensure optimal protection of all customers in a privacy preserving manner.

Backend preparation: Constantly during operation, the information on both events and threats can be abstracted and sent to the backend. This enables a backend "laboratory" to continue experimentation on more effective defence tools in a secure (sandbox-like) environment as well as provides further correlation and analysis of the data sent from the multitude of individual intelligent sensors.

Thus, the described model is essentially a new way to implement cyber security solutions in a distributed and adaptive but still co-operational manner across platforms, threats and scenarios. The next generation of a cyber security solution may thus be comprised of autonomous, interactive and localized AI agent swarms, and this is an example of an approach to reach that state.

An embodiment of the invention enables a solution of how not only create and deploy a multitude of adaptive network nodes, but also to make it possible for the nodes to share information and instructions among themselves as well as with the backend, where human experts may add insights and interpret findings in a way that is locally more precise but still contains also a global aspect.

In an embodiment of the invention, a swarm-type approach of multiple connected and interacting nodes that may have the capability to replicate themselves if needed is used. In an embodiment, distributed reinforcement learning with meta-learning, world models and information sharing is used. Further, language models that are shared by both the AI and human experts for information sharing may be utilized. In an embodiment, purpose-based learning with rules of engagement to avoid undesired behaviour is used.

In an embodiment, multiple domains of information may be encoded into event abstractions for enabling transferability.

Generally, the proposed approach introduces number of improvements to conventional solutions. Such improvements comprise, for example, enabling shared learning with minimal data transfer as well as human-understandable mean of communicating with the AI (language model). This in turn enables learning not only from data based on what has been seen but also learning between AI agents and also from the human experts in an interactive model that produces essentially true next generation dynamically adaptive swarm artificial intelligence based EPP and/or ECR solution.

Another improvement according to an embodiment is that by performing more actions on the client endpoints, cost of doing purely backend processing with ever-growing amounts of data is reduced. Further, by sending only data that is needed and often in an abstracted form, privacy concerns can be reduced. Further, key security issues of model stealing and model misleading on a mass scale can be avoided due to using individualized local models: same mistakes are not learned, and all the models are not the same. Further, sharing abstractions and bootstrapping information instead of increments or full models helps reducing challenges in sharing learnt information that are caused by the complexity of the learning processes.

Further improvement according to an embodiment is that the accuracy of models generated can be optimized for local performance due to using local learning of patterns specific to the customer/host. Further, local learnings can be shared in a more general fashion across customers while maintaining confidentiality of customer systems due to abstractions of learnings used. Further improvement is also the ability to find the most appropriate preventive measures by using evolutionary approaches to prevention.

Another improvement in an embodiment is that human expert guidance can be incorporated into an AI driven process by using language model—based abstractions in addition to data sharing. Further, it can be ensured that the AI process does not learn in undesired directions when not controlled by using rules of engagement to control actions. Further improvement is that the ever-changing threat landscape can be adapted to by dynamic learning and global use of information.

As described above, the nature of the model used by the system (e.g. EDR) may be, or may incorporate elements, from one or more of the following: a neural network trained using a training data set, exact or heuristic rules (e.g. hardcoded logic), fuzzy logic based modelling, and statistical inference based modelling. The model may be defined to take into account particular patterns, files, processes, connections, and dependencies between processes.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. Lists and groups of examples provided in the description given above are not exhaustive unless otherwise explicitly stated.

The invention claimed is:

1. A computer-implemented method comprising:
   distributing components of a threat detection model for a threat control network, the threat control network comprising interconnected network nodes, each network node comprising a computer or network enabled hardware having a processor and a memory storing instructions thereon which when executed by the processor cause the computer or network enabled hardware to receive said components of the threat detection model,
   wherein the threat control network comprises security agent modules in electronic communication with the network nodes which collect data related to the respective network node, share information based on the collected data in an established internal network and use the collected data and information received from the internal network for generating and adapting threat detection models related to the respective network node,
   wherein at least two of the network nodes comprise at least the following components of the threat detection model:
      detection logic comprising machine learning related detection rules,
      detection logic parameter values comprising at least parameters to enable machine learning inference, wherein the detection logic parameter values make detection rules functional,
      core data primitive comprising a set of key primitives,
   wherein parameterization and distributing of said components is performed independently from the other said components of the same network node so that the threat detection models are updated to individualized threat detection models for each parameterized node resulting in local variations of machine learning parameters and operations, and
   wherein the parameterization and distribution of the components of the threat detection model of a node is carried out independently from each other at different time instances, from different sources and at different time intervals and update frequencies.

2. The method according to claim 1, wherein at least part of the nodes comprising the said components of the threat detection model comprises a security agent module.

3. The method according to claim 1, wherein at least part of the nodes comprising the said components of the threat detection model is a part of a backend system.

4. The method according to claim 1, wherein each security agent module comprises the said components of the threat detection model and/or the said components of the threat detection model are distributed to security agents.

5. The method according to claim 1, wherein the detection logic is updated multiple times a day, hourly, or daily, and/or modified based on human input.

6. The method according to claim 1, wherein the detection logic parameter values are updated automatically by machine learning, multiple times a day or multiple times in an hour.

7. The method according to claim 1, wherein detection logic parameter values comprise at least one of the following: parameters to enable membership checks and thresholds over results of machine-learning-model.

8. The method according to claim 1, wherein core data primitive is updated with software build updates, and/or modified based on human input.

9. The method according to claim 1, wherein the threat control network is a threat control swarm intelligence network, and/or the threat control swarm intelligence network comprises a plurality of interconnected network nodes of a local computer network.

10. The method of claim 1, wherein the machine learning related detection rules, parameter values, the set of key primitives and/or the detection mechanisms used to detect security threats comprise machine learning related detection rules, parameter values and/or key primitives and/or comprise using machine learning models, a statistical anomaly detection, and/or fuzzy logic based models.

11. The method of claim 1, wherein each security agent module comprises a semi-independent security node.

12. The method of claim 1, wherein each security agent module comprises a data collector or sensor.

13. The method of claim 1, wherein the security agent modules use sandboxing techniques for determining a remedy for the detected security threat and/or further analyzing the behavior of potentially malicious entities.

14. A system comprising a threat control network, the threat control network comprising interconnected network nodes, each network node comprising a computer or network enabled hardware having a processor and a memory storing instructions thereon which when executed by the processor cause the computer or network enabled hardware to receive said components of the threat detection model,
wherein the threat control network comprises security agent modules in electronic communication with the network nodes which are configured to collect data related to the respective network node, share information based on the collected data in an established internal network and use the collected data and information received from the internal network for generating and adapting threat detection models related to the respective network node,
wherein at least two of the network nodes comprise at least the following components of the threat detection model:
detection logic comprising machine learning related detection rules,
detection logic parameter values comprising at least parameters to enable machine learning inference, wherein the detection logic parameter values make detection rules functional,
core data primitive comprising a set of key primitives,
wherein parameterization and distributing of said components is performed independently from the other said components of the same network node so that the threat detection models are updated to individualized threat detection models for each parameterized node resulting in local variations of machine learning parameters and operations, and wherein the parameterization and distribution of the components of the threat detection model of a node is carried out independently from each other at different time instances, from different sources and at different time intervals and update frequencies.

15. A computer program product comprising at least one non-transitory computer-readable storage medium having computer readable code which, when run on a computer system or server, causes the computer system or server to:
distribute components of a threat detection model for a threat control network, the threat control network comprising interconnected network nodes, each network node comprising a computer or network enabled hardware having a processor and a memory storing instructions thereon which when executed by the processor cause the computer or network enabled hardware to receive said components of the threat detection model,
wherein the threat control network comprises security agent modules in electronic communication with the network nodes which collect data related to the respective network node, share information based on the collected data in an established internal network and use the collected data and information received from the internal network for generating and adapting threat detection models related to the respective network node,
wherein at least two of the network nodes comprise at least the following components of the threat detection model:
detection logic comprising machine learning related detection rules,
detection logic parameter values comprising at least parameters to enable machine learning inference, wherein the detection logic parameter values make detection rules functional,
core data primitive comprising a set of key primitives,
wherein parameterization and distributing of said components is performed independently from the other said components of the same network node so that the threat detection models are updated to individualized threat detection models for each parameterized node resulting in local variations of machine learning parameters and operations, and
wherein the parameterization and distribution of the components of the threat detection model of a node is carried out independently from each other at different time instances, from different sources and at different time intervals and update frequencies.

* * * * *